Feb. 13, 1934.  C. C. BUTLER  1,946,470
STERILIZING MACHINE FOR BOXES
Filed July 6, 1931
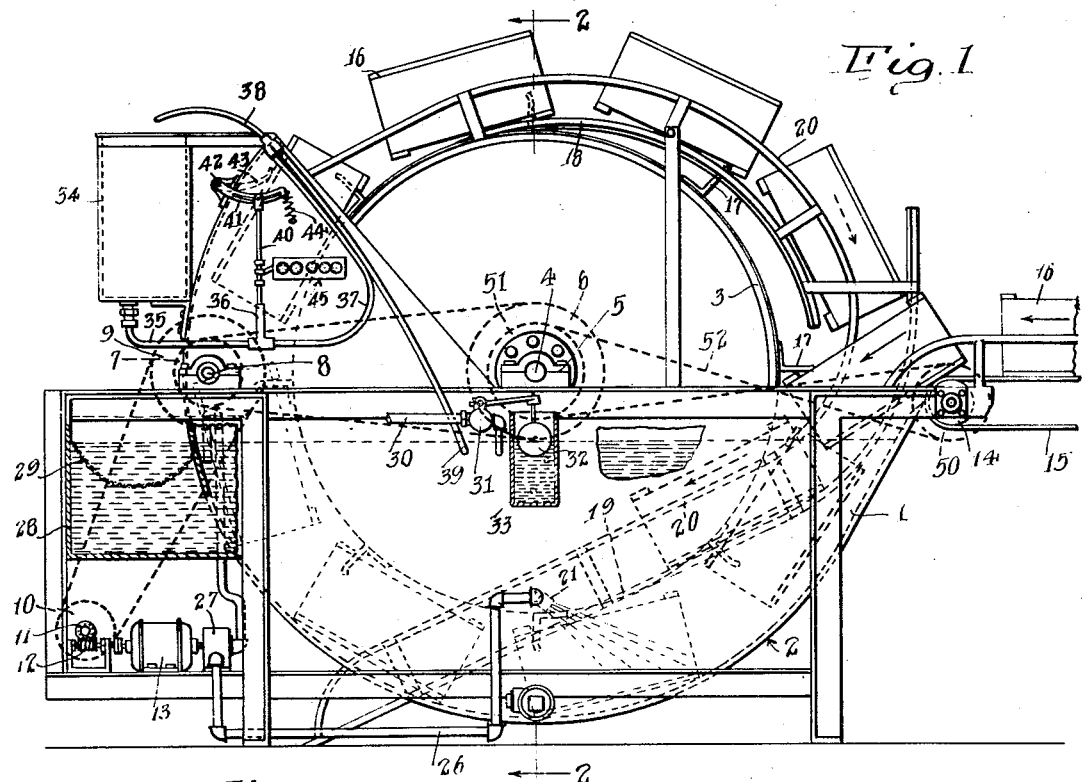
Fig. 1
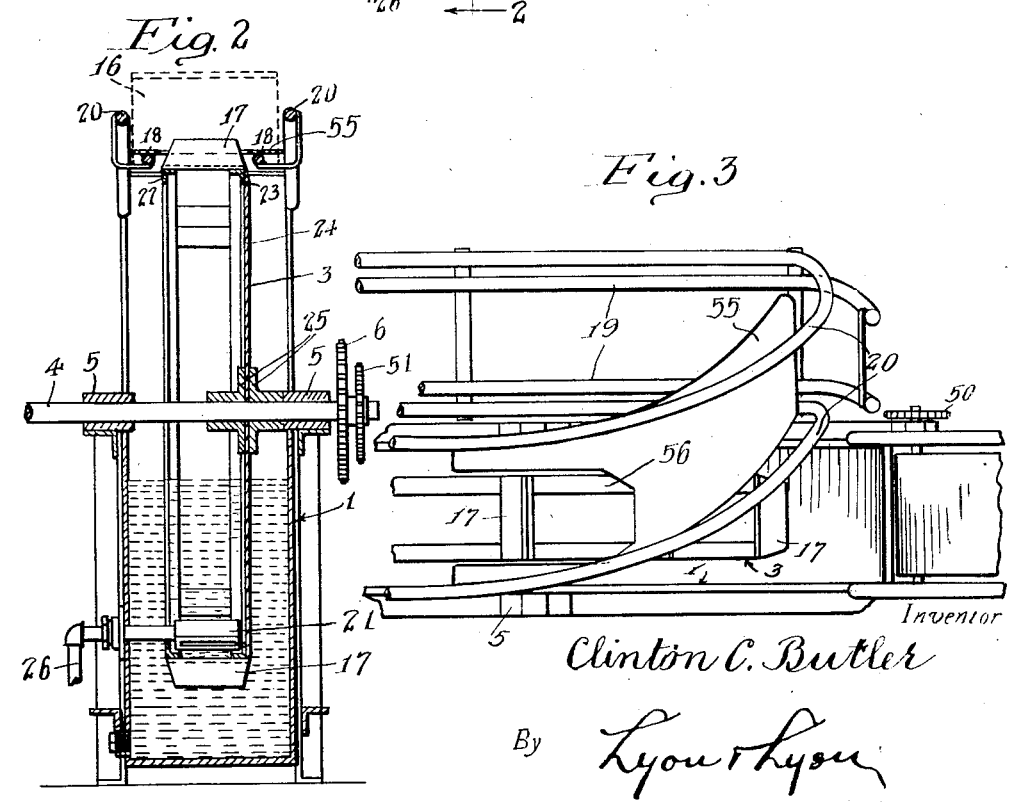
Fig. 2
Fig. 3
Inventor
Clinton C. Butler
By Lyon & Lyon
Attorneys Patented Feb. 13, 1934

1,946,470

UNITED STATES PATENT OFFICE 1,946,470

STERILIZING MACHINE FOR BOXES

Clinton C. Butler, Pomona, Calif., assignor to Food Machinery Corporation, San Jose, Calif., a corporation of Delaware Application July 6, 1931. Serial No. 548,849

9 Claims. (Cl. 167—3)

This invention relates to sterilizing machines for treating boxes, crates or similar containers with liquid disinfectant.

A broad object of the invention is to continuously pass boxes to be sterilized through a tank of treating fluid, drain them over the tank, thereby avoiding waste of the treating fluid, and deliver them right side up.

Another object is to automatically supply additional concentrated sterilizing fluid to the tank in proportion to the amount removed by adherence to the boxes being treated.

Another object is to automatically remove refuse, such as leaves and chips, from the treating tank, thus maintaining the solution clean at all times.

An understanding of my invention and its mode of operation, can best be imparted through a detailed description with reference to the drawing in which Fig. 1 is a side elevational view of my treater;

Fig. 2 is a vertical section of the machine taken in the plane 2—2 of Fig. 1; and Fig. 3 is a plan view of the machine.

Referring to Fig. 1, my sterilizing machine comprises a tank 1 having a curved bottom 2 in which is mounted a carrier wheel 3. Wheel 3 is rigidly secured to shaft 4 turning in bearings 5 secured to the frame work of the tank. A sprocket wheel 6 is fixed to the end of shaft 4 projecting outside of the tank and is coupled by a chain to a sprocket 7 on a second shaft 8 also mounted in bearings secured to the frame work of the tank. Shaft 8 has rigidly affixed thereto a larger sprocket wheel 9 driven by a chain from a fourth sprocket wheel 10, wheel 10 being mounted on a shaft carrying a worm wheel 11, which is driven by a worm 12 on the shaft of a motor 13.

Tank 1, as shown in Fig. 1, is substantially semicylindrical in shape. Positioned adjacent the front end of the tank and rotatably connected to the frame work thereof, is a roller 14 forming one element of a conveyor belt 15. The conveyor belt 15 may extend any desired distance away from the tank and since the construction of such devices is well known in the art, a detailed description of its construction is unnecessary. The belt may be driven from a separate source of power, but it is preferred to drive it from the shaft 4 in order that the boxes will be delivered at the proper rate with respect to the speed of the wheel 3; therefore, roller 14 is shown provided with a sprocket wheel 50 which is coupled to a sprocket wheel 51 on the shaft 4 by a chain 52. Chain 52 must be crossed, as indicated, in order to drive the conveyor roller 14 in a direction opposite to that of wheel 3. When the machine is in operation, conveyor belt 15 delivers boxes or crates 16 in continuous succession to the edge of the tank 1, where they are caught by projections 17 on wheel 3 and carried through the tank.

Tank 1 is kept full of liquid to the level shown by the dotted line in Fig. 1. Therefore, when boxes are first delivered to the tank from conveyor belt 15, they float on the surface of the liquid until caught by one of the hooks 17 and carried below the surface of the liquid. Ordinarily, the natural buoyance of the boxes or crates holds them firmly against the wheel 3, while they are passed through the liquid in the tank 1, but to prevent any possibility of the boxes becoming disengaged from hook 17, the wheel 3 may be positioned close enough to the bottom of the tank to prevent the boxes moving outwardly far enough to disengage from the hooks. As the boxes rise from the liquid, referring to the left of Fig. 1, they are supported entirely by hooks 17 until they are raised well above the liquid. Thereafter they rest on the periphery of the wheel until they get to the highest point where they then slide onto a track formed by a plate 55 mounted on a pair of rails 18. Plate 55 has a slot 56 therein to permit the passage of hooks 17. This slot extends to a point where plate 55 is sufficiently removed, radially, from wheel 3 to permit the hooks 17 to pass thereunder. As soon as the boxes have passed the uppermost part of the wheel they are separated from the wheel by plate 55 so that they clear the hooks 17 and thereafter are carried along the plate 55 by gravity.

As shown by Fig. 3, track 18 is curved away from the tank so that the boxes follow a spiral course that takes them clear of other boxes entering the tank from conveyor belt 15. Furthermore, when the boxes reach a point about level with the point of entry, they tip over and thereafter slide down a second track 19 which carries them to the side of the treating tank where they may be removed in any manner desired either by taking them away singly or by passing them onto a second conveyor belt.

To guide the boxes into the tank from conveyor belt 15, and to keep them on plate 55 and track 19, side rails 20 are provided. These rails are spaced apart a distance slightly greater than the width of the boxes so that the boxes move readily therebetween but are restrained from moving laterally out of their proper path through the treating machine. At the point in their path where the boxes leave plate 55 and fall onto track 19, the guide rails 20 are particularly necessary to keep the boxes from twisting and bouncing off the track 19.

To insure thorough wetting of the boxes by the sterilizing liquid, a jet, or jets, 21 is provided just within the outer circumference of wheel 3 and preferably at the lowest point thereof. Wheel 3, as shown in Fig. 2, is made open on one side, being formed of two circumferential rails 22 and 23, to which hooks 17 are attached. A disc 24 forms one side of the wheel, being secured at its periphery to the circumferential frame member 23. The center of the disc is clamped between two hub members 25 which are secured to shaft 4 and rotate therewith. Jet 21 is connected by a pipe 26 to the discharge passage of a centrifugal pump 27 mounted on the shaft of motor 13. The intake of pump 27 is connected to the bottom of an auxiliary reservoir 28 which is mounted on the end of the main tank 1 and separated therefrom by a partition which extends almost, but not quite, up to the normal liquid level in the tank. Pump 27 therefore receives solution from auxiliary reservoir 28 and discharges it through pipe 26 and jet 21, creating a strong current which is directed outwardly through the open periphery of the wheel and into the boxes as they pass under the jet.

As solution is withdrawn from the auxiliary reservoir 28 and discharged into the main tank through nozzle 21, the level falls in the auxiliary reservoir 28 and rises in the main tank 1. Solution therefore overflows the partition separating the two tanks and there is a constant circulation from the main tank into the auxiliary tank and thence through jets 21 back into the main tank.

A screen 29 is so positioned in reservoir 28 as to separate it into an upper and a lower compartment. Any light trash, such as leaves or chips, which may be introduced into main tank 1 with the boxes, floats to the surface and is carried over into the auxiliary tank 28 where it is caught by the screen 29 and prevented from being carried into the pump 27 and thence back into the main tank. Screen 29 may be cleaned with a suitable rake or hoe when any considerable amount of refuse accumulates thereon, without shutting down the machine.

When the machine is operating, as the boxes are carried above the tank by wheel 3, they have a chance to drain and any drainage naturally falls back into the tank and is not lost, but the boxes, being of porous material, such as wood, absorb more or less solution that does not drain off and is therefore permanently removed from the tank. To maintain the solution level, additional water is automatically introduced from a supply pipe 30 to the main tank 1 through a valve 31 operated by a float 32, the valve opening to admit additional fluid whenever the float 32 drops below a predetermined point. Because the passage of the boxes through the tank sets up a rather violent agitation of the solution therein which causes waves at the surface, float 32 is closed in a container 33 having small holes near the top and bottom thereof. With this arrangement, the level of the liquid within the container 33 is that of the average level in the tank 1 but does not fluctuate due to waves in the main tank.

If water alone were added to the tank to replace the solution lost by adherence to the boxes, the solution would soon become diluted. I, therefore, provide special adjustable means for supplying additional amounts of concentrated sterilizing solution in proportion to the actual number of boxes being treated. This means comprises a tank 34 containing concentrated solution and a tube 35 extending from the bottom of the tank to a plunger pump 36 and a tube 37 extending from pump 36 to the main tank at point 39. Tube 37 is brought above the level of the solution in tank 34 and vented through an open tube 38 in order to prevent any possibility of a constant flow of the concentrated sterilizing liquid from tank 34 into tank 1 when the machine is inactive, as the result of leakage past the check valves in pump 36. Such leakage is precluded with the arrangement shown because the open vent 38 prevents the solution from siphoning out through tube 37. The upper end of the piston or plunger 40 of pump 36 is hingedly connected to a lever 41 secured to a shaft 42 which turns in brackets attached to the frame work of the machine. Attached to shaft 42 is another lever 43 which is of such length as to contact with and be raised by each box carried on wheel 3. Thus each time a box passes the lever 43 it raises it and rotates the shaft 42, thus raising the piston 40 of the pump. When the box has passed, the levers and piston rod 40 are retracted to their original position by a spring 44 and this retraction of the piston forces a fixed amount of solution (which had been drawn into the pump 36 from tank 34 on the upstroke of the piston) through tube 37 and into the main tank 1 at point 39. Levers 43 may be secured to shaft 42 by a set nut so that it may be rotated up or down on shaft 42 to determine the stroke of piston 40 when sterilizing boxes of a given size. When the machine is in operation, lever 43 is clamped firmly to shaft 42 so that it actuates the pump.

A counter 45 is mounted on the side of the frame adjacent to the pump 36 with its actuating lever connected to piston rod 40. Thus, the counter is actuated each time the piston rises and the counter, therefore, registers the number of boxes treated.

In operation, the main tank 1 and the auxiliary tank 28 are filled with disinfectant solution of a desired strength and the motor 13 is started. Motor 13 thereupon continuously rotates the wheel 3 in the main tank and the conveyor belt pulley 14, wheel 3 rotating in a clockwise direction and pulley 14 rotating in a counterclockwise direction. The rotation of pulley 14 moves the upper side of conveyor belt 15 continuously to the left and delivers boxes 16 to the edge of the treating tank 1. As each box 16 is delivered from the conveyor belt 15 it drops into the tank and floats on the surface of the solution therein until engaged by a hook 17 on the continuously rotating wheel 3 and drawn below the surface of the solution. Immediately the box is submerged, most of its surface is wetted and sterilized by the solution, but it is found that air bubbles sometimes form on portions of the inner surface of the boxes and do not break of themselves. However, as the boxes are carried by the rotation of the wheel below jet 21, the strong current of solution produced by jet 21 is directed into the box and breaks any air bubbles that may exist on the inner surface of the box, so that the entire inner surface of the box is completely sterilized. The box thereafter continues to move through the solution and finally is lifted therefrom and carried upward by hook 17 until it engages lever 43 and rotates the lever about its shaft 42 sufficiently to permit the box 16 to slide thereunder. As lever 43 is raised by the box it rotates shaft 42 and lever 41, which lifts the plunger 40 of the pump 36, thus drawing into the pump a charge of concentrated solution from tank 34. The box 16 continues to move around with the wheel 3, sliding under the elevated lever 43. As soon as the box has passed the lever 43 the latter is free to drop back into its normal position and is forcibly retracted to this position by the spring 44 acting through lever 41 and shaft 42. As lever 41 is retracted the plunger rod 40 is pulled downward, thus ejecting the charge of concentrated solution from pump 36 into tube 37 and thence into the main tank 1 at point 39. The retraction of piston rod 40 simultaneously actuates the counter 45, thus registering the passage of the box. After passing the lever 43, the box 16 is carried by hook 17 to a point substantially over the shaft 4, where it slides onto the plate 55. The box is still engaged by hook 17 and is moved by it along plate 55 until the track 18 has separated from the periphery of wheel 3 far enough to disengage the hook 17. At the point where the hook 17 is disengaged, plate 55 is inclined at a sufficiently steep angle to permit box 16 to continue its onward motion by gravity. It, therefore, slides along the plate 55 to the end thereof, where it falls vertically a short distance onto the lower track 19 and slides to the bottom thereof. From the time the box leaves the confines of the tank it is guided in a straight course by the side rails 20, which are spaced outwardly from track 18 approximately half the height of the boxes and are spaced far enough from each other to permit the boxes to pass readily therebetween. As indicated in the description of the apparatus, the boxes may be removed from the lower end of track 19 in any desired manner.

I claim:

1. In a machine of the type described, a treating tank containing treating liquid, means for continuously delivering objects to be treated to said tank, a constantly moving conveyor having projections thereon for engaging said objects and carrying them under the surface of said liquid, and thereafter lifting said objects from the solution and carrying them back over the tank, and means for receiving said objects from said conveyor and conducting them away from said tank.

2. In a machine of the type described, a treating tank containing treating liquid, means for continuously delivering objects to be treated to said tank, a wheel rotating in a vertical plane in said tank, hooks on said wheel for engaging said objects and carrying them under the surface of the solution, then up out of the solution and back over the tank to a position elevated thereabove, and track means for receiving said objects from said wheel and conducting them down and away from said machine.

3. The method of treating open top boxes in a tank containing liquid disinfectant which comprises passing said boxes open side up beneath the surface of said liquid and in direct contact therewith, forcibly directing said liquid into said boxes, lifting said boxes from said liquid, inverting them, again inverting them, and delivering them right side up.

4. In a machine of the type described, a treating tank containing treating liquid, means for continuously delivering objects to be treated to said tank, a rotating wheel in said tank having hooks about its periphery for engaging said objects and carrying them through said solution beneath said wheel and thereafter lifting them on said wheel to an elevated position above said tank, tracks for receiving said objects when in their uppermost position for conveying said objects away from said wheel, said tracks being curved downwardly from a horizontal plane to a substantially perpendicular position, other tracks positioned outwardly and downwardly with respect to said first track and curved in the same direction as said first track for receiving objects from said first track in inverted position.

5. In a machine of the type described, a treating tank containing a treating solution, means for continuously passing objects to be treated through said solution and means actuated by the passage of each object from the solution for forcing a predetermined amount of new solution into said tank.

6. In a machine of the type described, a treating tank containing a treating solution, means for continuously delivering objects to be treated to said tank, means for submerging said objects and subsequently lifting them from said tank, a supply tank of fresh solution, a pump for pumping said solution from said supply tank to said main tank, a lever positioned to be engaged and moved by each of said objects leaving said tank, and means operatively connecting said lever with said pump whereby upon the passage of each object from the tank a predetermined amount of solution is forced from said supply tank into said main tank.

7. In a machine of the type described, a treating tank containing a treating solution consisting of a concentrated disinfectant and a diluent, means for passing objects through said solution, a source of concentrated disinfectant, means responsive to the passage of each object through said tank to force a predetermined amount of said concentrated solution from said source to said tank, a source of diluent under pressure, and means for admitting diluent from said source into said tank comprising a float valve responsive to the level of solution in said tank.

8. In a machine of the type described, a treating tank, an auxiliary tank connected to said treating tank by an overflow passage, said overflow passage being below the normal liquid level in said treating tank, a screen in said auxiliary tank, a liquid line extending from said auxiliary tank below said screen to said main tank, and means for constantly circulating liquid from said auxiliary tank through said liquid line into said treating tank and thence through said overflow back into the auxiliary tank.

9. In a machine of the type described, a tank containing treating liquid, means for delivering open boxes to said tank, an endless conveyor disposed to successively submerge said boxes in contact with the treating liquid and thereafter elevate them into upside down position above the tank to drain them, means for driving said conveyor, and means cooperating with the conveyor to receive boxes discharged therefrom at said elevated position and conduct them away from the tank.

CLINTON C. BUTLER.